(12) United States Patent
King

(10) Patent No.: US 10,577,074 B2
(45) Date of Patent: Mar. 3, 2020

(54) AIRCRAFT MONUMENT HAVING A SECONDARY SECURITY DOOR

(71) Applicant: The Boeing Company, Chicago, IL (US)

(72) Inventor: Timothy T. King, Freeland, WA (US)

(73) Assignee: The Boeing Company, Chicago, IL (US)

( * ) Notice: Subject to any disclaimer, the term of this patent is extended or adjusted under 35 U.S.C. 154(b) by 301 days.

(21) Appl. No.: 15/599,321

(22) Filed: May 18, 2017

(65) Prior Publication Data

US 2018/0334237 A1 Nov. 22, 2018

(51) Int. Cl.
*B64C 1/14* (2006.01)
*B64D 11/02* (2006.01)
*B64D 45/00* (2006.01)

(52) U.S. Cl.
CPC ............ *B64C 1/1469* (2013.01); *B64D 11/02* (2013.01); *B64D 45/0015* (2013.01)

(58) Field of Classification Search
CPC ........ B64C 1/1469; B64D 11/02; B64D 11/04
USPC ...................................................... 244/129.5
See application file for complete search history.

(56) References Cited

U.S. PATENT DOCUMENTS

| | | | | |
|---|---|---|---|---|
| 6,783,098 | B1 * | 8/2004 | Chavez ................. | B64C 1/1469 244/118.5 |
| 2003/0052225 | A1 * | 3/2003 | Butzlaff ................ | B64C 1/1469 244/118.5 |
| 2003/0057324 | A1 * | 3/2003 | Meszaros .............. | B64C 1/1469 244/119 |
| 2003/0066931 | A1 * | 4/2003 | Ward ..................... | B64C 1/1469 244/118.5 |
| 2003/0192989 | A1 * | 10/2003 | Owen ..................... | B64C 1/1469 244/118.5 |
| 2004/0061027 | A1 * | 4/2004 | Movsesian ............ | B64C 1/1469 244/129.1 |
| 2004/0118976 | A1 * | 6/2004 | Albertelli ................ | B29C 70/30 244/118.5 |
| 2004/0227034 | A1 | 11/2004 | Wentland et al. | |
| 2005/0218266 | A1 * | 10/2005 | Bandy ................... | B64C 1/1469 244/118.5 |
| 2005/0224649 | A1 * | 10/2005 | Tomiyama ............ | B64C 1/1469 244/118.5 |
| 2005/0247823 | A1 * | 11/2005 | Wood ..................... | B29C 45/14 244/129.5 |
| 2006/0000946 | A1 * | 1/2006 | Garofani ............... | B64C 1/1469 244/118.5 |
| 2006/0048449 | A1 * | 3/2006 | Roques ................. | B64C 1/1407 49/62 |
| 2006/0065782 | A1 * | 3/2006 | French .................. | B64C 1/1469 244/118.5 |

(Continued)

FOREIGN PATENT DOCUMENTS

WO  WO-03089300 A1 * 10/2003 ............... B64C 1/14
WO  WO2014057669 A1   4/2014

*Primary Examiner* — Christopher P Ellis
(74) *Attorney, Agent, or Firm* — Yee & Associates, P.C.

(57) ABSTRACT

An aircraft comprises a cockpit, a passenger cabin, and an aircraft monument. The aircraft monument contains a hallway connecting the cockpit and the passenger cabin, wherein the aircraft monument is formed of a plurality of walls joined together to form a unitary structure. The plurality of walls includes a first wall having a first doorway and a second wall having a second doorway. A secondary security door is within the second doorway.

21 Claims, 8 Drawing Sheets

(56) References Cited

U.S. PATENT DOCUMENTS

| | | | |
|---|---|---|---|
| 2006/0145007 A1* | 7/2006 | Melberg | B64C 1/1469 244/118.5 |
| 2008/0164377 A1* | 7/2008 | Lautridou | B64C 1/1469 244/229 |
| 2009/0065641 A1* | 3/2009 | Koehn | B64C 1/1469 244/118.5 |
| 2010/0140407 A1* | 6/2010 | Pujol | B64C 1/1469 244/129.5 |
| 2010/0237193 A1* | 9/2010 | Yoshizaki | B64C 1/1407 244/129.5 |
| 2012/0292447 A1* | 11/2012 | Erickson | B64D 11/0023 244/129.5 |
| 2013/0269258 A1* | 10/2013 | Koch | B64C 1/1469 49/67 |
| 2013/0292513 A1* | 11/2013 | Guering | B64C 1/1469 244/118.5 |
| 2015/0259069 A1 | 9/2015 | Koyama | |
| 2016/0332718 A1* | 11/2016 | Guering | B64C 1/1438 |
| 2018/0099762 A1* | 4/2018 | MacLean | B64D 45/0015 |
| 2018/0265216 A1* | 9/2018 | Breigenzer | B64D 45/0015 |
| 2018/0346091 A1* | 12/2018 | Movsesian | B64C 1/1469 |

* cited by examiner

AIRCRAFT MONUMENT HAVING A SECONDARY SECURITY DOOR

BACKGROUND INFORMATION

1. Field

The present disclosure relates generally to aircraft, and more specifically, to security on an aircraft. Still more particularly, the present disclosure relates to providing a secondary security door for a cockpit of an aircraft.

2. Background

During flight, cockpit doors are locked, separating the cockpit from the passenger cabin. During flight, a pilot may leave the cockpit, for example to use the bathroom. In some long flights, the pilot may leave the cabin to change flight crew.

Cockpit doors are designed to prevent unauthorized entry. Cockpit doors are also designed to maintain a pressure separation between the cockpit and the passenger cabin.

When the cockpit door is open, unauthorized entry into the cockpit is more likely. Therefore, it would be desirable to have a method and apparatus that takes into account at least some of the issues discussed above, as well as other possible issues.

SUMMARY

In one illustrative embodiment, an aircraft monument is presented. The aircraft monument comprises a plurality of walls, a secondary security door, and a hallway. The plurality of walls is joined together into a unitary structure. The plurality of walls comprises a first wall having a first doorway and a second wall having a second doorway. The secondary security door is within the second doorway in the second wall. The hallway is between the first doorway and the second doorway.

In another illustrative embodiment, an aircraft is presented. The aircraft comprises a cockpit, a passenger cabin, and an aircraft monument. The aircraft monument contains a hallway connecting the cockpit and the passenger cabin, wherein the aircraft monument is formed of a plurality of walls joined together to form a unitary structure. The plurality of walls includes a first wall having a first doorway and a second wall having a second doorway. A secondary security door is within the second doorway.

In yet a further illustrative embodiment, an aircraft is presented. The aircraft comprises a cockpit door and a secondary security door. A first doorway in a first wall of an aircraft monument provides an opening to access the cockpit door. The secondary security door is within a second doorway in a second wall of the aircraft monument. The aircraft monument comprises a plurality of walls joined together to form a unitary structure. The plurality of walls includes the first wall and the second wall. The aircraft monument further comprises a hallway between the first doorway and the second doorway.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
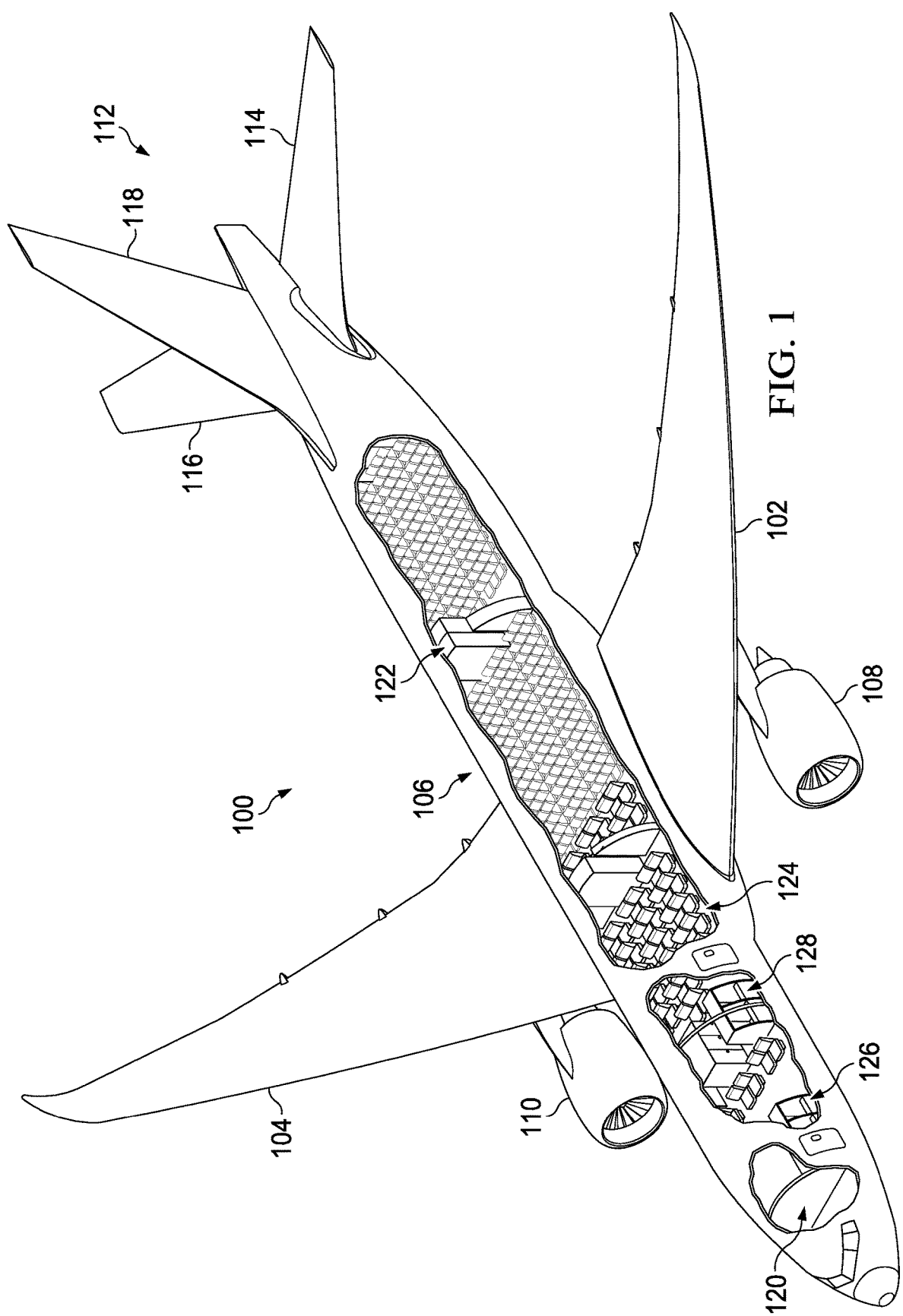
FIG. 1 is an illustration of an aircraft in which an illustrative embodiment may be implemented.

The different illustrative embodiments recognize and take into account one or more different considerations. For example, the illustrative embodiments recognize and take into account that aircrafts are currently manufactured using a plurality of aircraft monuments. In conventional aircraft monuments, each aircraft monument has a single function. The illustrative embodiments recognize and take into account that conventional functional modules for aircraft monuments include a lavatory, a galley, a workstation, equipment, a crew rest area, and other individual functional modules.

The illustrative embodiments recognize and take into account that each type of functional module has its own technical specifications. The illustrative embodiments recognize and take into account that technical expertise for a designated type of functional module may be concentrated into a design team. The illustrative embodiments recognize and take into account that each design team may be focused on a single type of functional module.

The illustrative embodiments recognize and take into account that an aircraft monument may resemble a box. The illustrative embodiments recognize and take into account that an aircraft monument may include an integrated floor. The illustrative embodiments recognize and take into account that when present, installing the aircraft monument includes fastening the integrated floor of the aircraft monument to a floor of the aircraft.

The illustrative embodiments also recognize and take into account that aircraft monuments contribute to the weight of an aircraft. The illustrative embodiments recognize and take into account that an aircraft monument may weigh more than individual dividing walls. For example, a unitary structure may have a higher weight than individual walls due to at least one of an integrated floor or an integrated ceiling.

As used herein, the phrase "at least one of," when used with a list of items, means different combinations of one or more of the listed items may be used, and only one of each item in the list may be needed. In other words, "at least one of" means any combination of items and number of items may be used from the list but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; or other suitable combinations.

The illustrative embodiments recognize and take into account that it is desirable to reduce the weight of an aircraft. The illustrative embodiments recognize and take into account that, where it meets technical specifications, it may be desirable to use individual dividing walls.

The illustrative embodiments recognize and take into account that it may be desirable to have a secondary security door to prevent unauthorized entry into the cockpit when the cockpit door is open. The illustrative embodiments recognize and take into account that a secondary security door desirably resists a designated amount of force. The illustrative embodiments recognize and take into account that the walls connected to the secondary security door may also desirably resist a set amount of force. The illustrative embodiments recognize and take into account that simply placing a secondary door into a conventional design may also include adding structural support to the walls connected to the secondary security door. The illustrative embodiments recognize and take into account that adding additional structural support to the walls adds substantial weight to the aircraft.

The illustrative embodiments recognize and take into account that there are technical specifications for pressure containment between the cockpit and the passenger cabin. The illustrative embodiments recognize and take into account that the cockpit door has technical specifications.

The illustrative embodiments recognize and take into account that adding a secondary security door may form a small hallway between monuments. The illustrative embodiments recognize and take into account that in some instances, air entering small spaces may lead to a "vacuum chamber" or a "wind tunnel" effect. A "vacuum chamber" or a "wind tunnel" effect may lead to undesirable forces on surrounding structures.

The illustrative embodiments recognize and take into account that adding a secondary security door between the cockpit door and the passenger cabin creates a small hallway enclosure between monuments that may have a "vacuum chamber" effect under some conditions. The illustrative embodiments recognize and take into account that the undesirable forces may act on at least one of the floor of the aircraft, the ceiling of the aircraft, or the surrounding monuments. When undesirable forces act on the ceiling of the aircraft or the floor of the aircraft, the undesirable forces are translated to the airframe of the aircraft.

The illustrative embodiments recognize and take into account that some secondary security door designs are formed of metal bars with large spaces between the bars. The illustrative embodiments recognize and take into account that the secondary security door designs having metal bars still present an undesirable physical barrier to air traveling through the small hallway. The illustrative embodiments thus recognize and take into account that secondary security door designs may still create "vacuum chamber" effects under certain conditions.

The illustrative embodiments recognize and take into account that current secondary security doors in conventional aircraft involve significant time and materials in modifying the aircraft design. The illustrative embodiments recognize and take into account that modifying the aircraft design is done for each type of security door on an individual basis.

The illustrative embodiments recognize and take into account that it would be desirable to have a secondary security door solution that takes into account the considerations above. The illustrative embodiments recognize and take into account that it would be desirable to present a secondary security door solution that could be used in more than one aircraft design. The illustrative embodiments recognize and take into account that it would be desirable to present a secondary security door solution that would not undesirably increase the aircraft's weight.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Body 106 also has cockpit 120 and passenger cabin 122. In this example, passenger cabin 122 may include passenger seating in seating area 124. Passenger seating may include a number of aircraft seats. As used herein, a "number of" items means one or more items. For example, a number of aircraft seats means one or more aircraft seats.

Further, seating area 124 in passenger cabin 122 may also include storage areas, such as a number of overhead compartments. Passenger cabin 122 also may include lavatory 126 and galley area 128. These two areas may be partitioned or separated from seating area 124 by a partitioning structure such as, for example, without limitation, a wall.

In some illustrative examples, at least one of lavatory 126, galley area 128, a storage area, or another desirable functional area may be created within an aircraft monument. Walls of an aircraft monument are joined into a unitary structure and then placed into aircraft 100. The aircraft monument is then secured within aircraft 100.

For example, when lavatory 126 is within an aircraft monument, lavatory 126 is a functional module in the aircraft monument. As another example, when galley area 128 is part of an aircraft monument, galley area 128 is a functional module in the aircraft monument.

An aircraft monument with a secondary security door, in accordance with an illustrative embodiment, may be used in aircraft 100. For example, an aircraft monument having a secondary security door may be installed within aircraft 100 to replace one of the conventional monuments, such as lavatory 126.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable types of aircraft. Also, other areas may be present in addition to seating area 124, lavatory 126, and galley area 128. Other areas may include, for example, without limitation, closets, storage areas, lounges, and other suitable areas for passenger seating. As another example, aircraft seats within seating area 124 may be arranged differently from the depicted example. In other illustrative embodiments, some seats may be grouped into sets of single seats instead of three seats or pairs of seats as illustrated in seating area 124.

Figure 2:
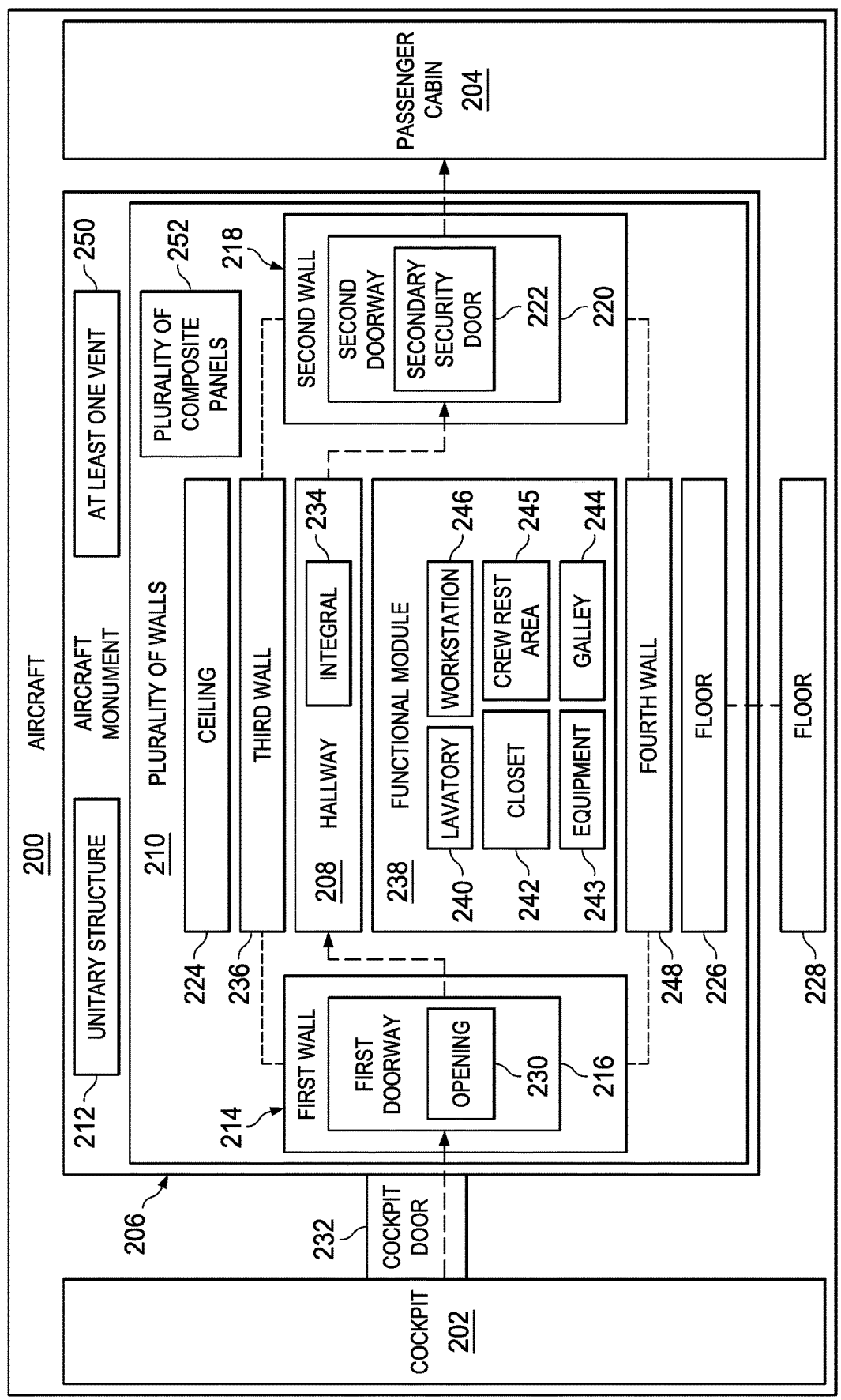
FIG. 2 is an illustration of a block diagram of an aircraft in accordance with an illustrative embodiment.

Turning now to FIG. 2, an illustration of a block diagram of an aircraft is depicted in accordance with an illustrative embodiment. Aircraft 100 in FIG. 1 may be one physical implementation of aircraft 200 shown in block form. Aircraft 200 includes cockpit 202, passenger cabin 204, and aircraft monument 206. Aircraft monument 206 contains hallway 208 connecting cockpit 202 and passenger cabin 204.

Aircraft monument 206 is formed of plurality of walls 210 joined together to form unitary structure 212. Unitary structure 212 may be described as integrated or consolidated. Unitary structure 212 forms the exterior of aircraft monument 206. Plurality of walls 210 includes first wall 214 having first doorway 216 and second wall 218 having second doorway 220. Secondary security door 222 is within second doorway 220.

First doorway 216 may be coupled to first wall 214 or embedded in first wall 214. In one illustrative example, when first doorway 216 is coupled to first wall 214, first doorway 216 is a bonded trim piece. In one illustrative example, when first doorway 216 is embedded in first wall 214, first wall 214 is a composite panel with first doorway 216 embedded in the composite panel.

Second doorway 220 may be coupled to second wall 218 or embedded in second wall 218. In one illustrative example, when second doorway 220 is coupled to second wall 218, second doorway 220 is a bonded trim piece. In one illustrative example, when second doorway 220 is embedded in second wall 218, second wall 218 is a composite panel with second doorway 220 embedded in the composite panel.

In some illustrative examples, plurality of walls 210 further includes ceiling 224 and floor 226. When floor 226 is present, floor 226 of aircraft monument 206 is joined to floor 228 of aircraft 200.

First doorway 216 provides opening 230 to access cockpit door 232. Cockpit door 232 maintains a pressure difference between cockpit 202 and hallway 208.

Hallway 208 is integral 234 to aircraft monument 206. Hallway 208 extends between first wall 214 and second wall 218. In some illustrative examples, third wall 236 forms one side of hallway 208. In some illustrative examples, aircraft monument 206 may only include hallway 208.

In some other illustrative examples, aircraft monument 206 further comprises functional module 238. Functional module 238 takes any desirable form. In some illustrative examples, functional module 238 includes at least one of lavatory 240, closet 242, equipment 243, galley 244, crew rest area 245, or workstation 246.

Equipment 243 takes the form of any desirable equipment. Equipment 243 may be communication equipment, display equipment, health equipment, or any other desirable electrical or mechanical components. Crew rest area 245 takes the form of beds, bunks, or any desirable type of rest area for crew.

When functional module 238 is present, both hallway 208 and functional module 238 are positioned between third wall 236 and fourth wall 248. Although aircraft monument 206 is depicted as having first wall 214, second wall 218, third wall 236, and fourth wall 248 joined to form outer walls of aircraft monument 206, plurality of walls 210 may have any desirable quantity of outer walls. Further, although aircraft monument 206 is discussed as being a "box," aircraft monument 206 may have any desirable three-dimensional shape.

When functional module 238 is present, aircraft monument 206 may replace a conventional aircraft monument having the same type of functional module in a design of aircraft 200. For example, when aircraft monument 206 includes lavatory 240, aircraft monument 206 may replace a conventional lavatory monument in a prior design for aircraft 200. Aircraft monument 206 having lavatory 240 is larger than a conventional lavatory monument in the same location in a conventional design for aircraft 200.

As another illustrative example, when aircraft monument 206 includes galley 244, aircraft monument 206 may replace a conventional galley monument in a prior design for aircraft 200. Aircraft monument 206 having galley 244 is larger than a conventional galley monument in the same location in a conventional design for aircraft 200.

In some illustrative examples, aircraft monument 206 further comprises at least one vent 250 configured to relieve a pressure difference between cockpit 202 and passenger cabin 204. At least one vent 250 may be positioned in any desirable location within plurality of walls 210.

FIG. 2 depicts aircraft monument 206 comprising plurality of walls 210 jointed together into unitary structure 212, secondary security door 222, and hallway 208. Plurality of walls 210 include first wall 214 having first doorway 216 and second wall 218 having second doorway 220. Secondary security door 222 is within second doorway 220 in second wall 218. Hallway 208 is between first doorway 216 and second doorway 220.

In some illustrative examples, plurality of walls 210 comprises plurality of composite panels 252. Plurality of composite panels 252 are joined together using any desirable method to form unitary structure 212. In some illustrative examples, each of plurality of walls 210 is a single composite panel of plurality of composite panels 252. In other illustrative examples, at least one wall of plurality of walls 210 is formed of more than one composite panel of plurality of composite panels 252.

The illustration of aircraft monument 206 of aircraft 200 in FIG. 2 is not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

For example, plurality of walls 210 may have any desirable quantity of walls. As another example, aircraft monument 206 may have any desirable footprint.

In some illustrative examples, aircraft monument 206 does not include functional module 238. In these illustrative examples, only hallway 208 may be present inside the cavity formed by plurality of walls 210 of aircraft monument 206.

Aircraft monument 206 may be positioned in any desirable location relative to cockpit 202 in aircraft 200. In some illustrative examples, aircraft monument 206 is on a port side of aircraft 200. In other illustrative examples, aircraft monument 206 is on a starboard side of aircraft 200. In yet other illustrative examples, aircraft monument 206 is substantially centered in aircraft 200 between cockpit 202 and passenger cabin 204.

As another example, in some illustrative examples more than one functional component may be present in functional module 238. In one illustrative example, functional module 238 may include both equipment 243 and closet 242. Equipment 243 may take up a fraction of volume of functional module 238. The remaining volume may be used as stowage in the form of closet 242.

In another illustrative example, functional module 238 may include both equipment 243 and galley 244. Equipment 243 may take up a fraction of volume of functional module 238. The remaining volume may be used as stowage in the form of galley 244.

Figure 3:
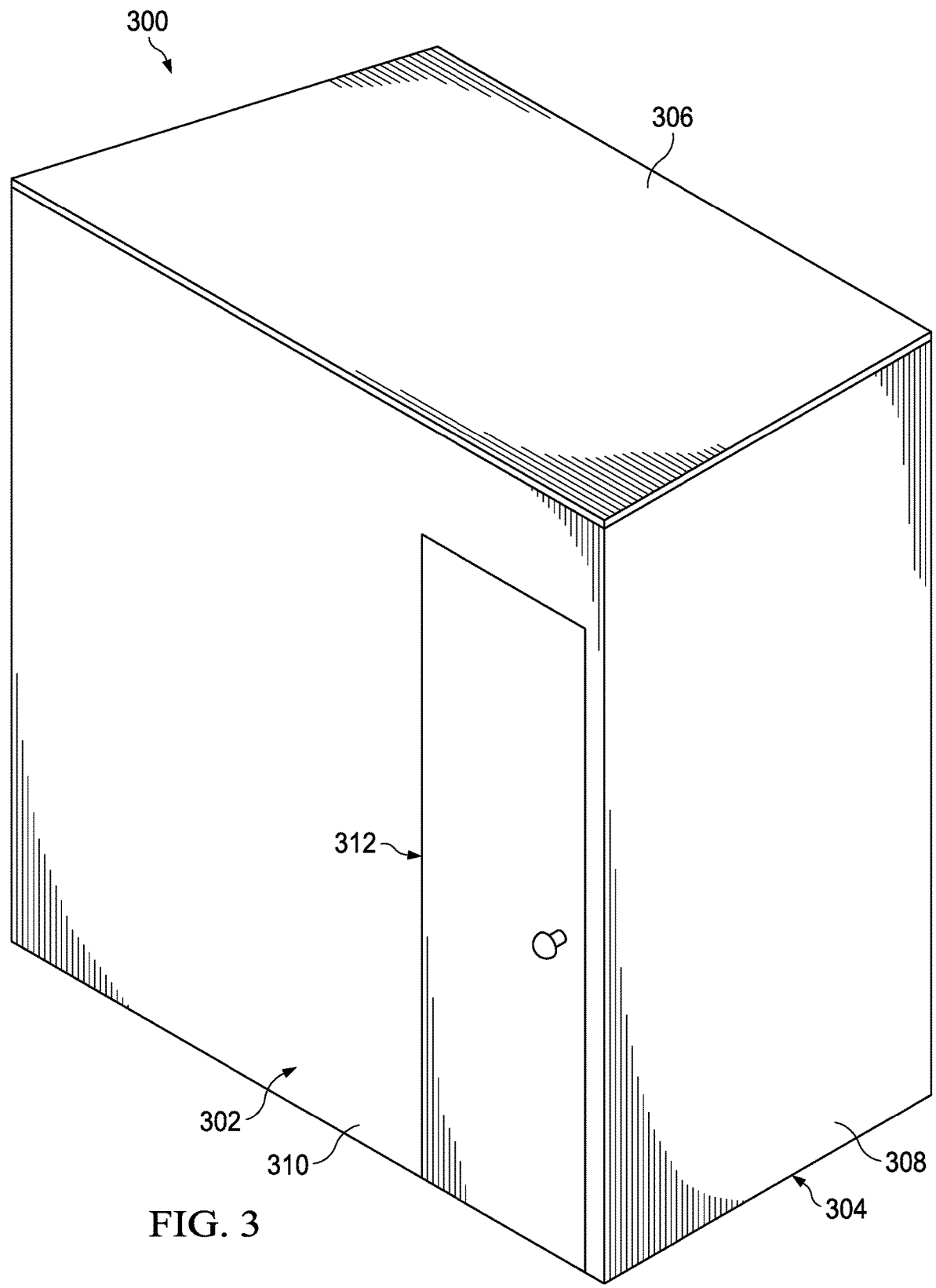
FIG. 3 is an illustration of a top perspective view of an aircraft monument in accordance with an illustrative embodiment.

Turning now to FIG. 3, an illustration of a top perspective view of an aircraft monument is depicted in accordance with an illustrative embodiment. Aircraft monument 300 is a physical implementation of aircraft monument 206 of FIG. 2. Aircraft monument 300 may be installed in aircraft 100 of FIG. 1 or aircraft 200 of FIG. 2.

Aircraft monument 300 has plurality of walls 302 joined together into unitary structure 304. Unitary structure 304 may be considered as a single structure. Unitary structure 304 forms the exterior of aircraft monument 300. Plurality of walls 302 includes ceiling 306, third wall 308, and second wall 310 having second doorway 312.

Figure 4:
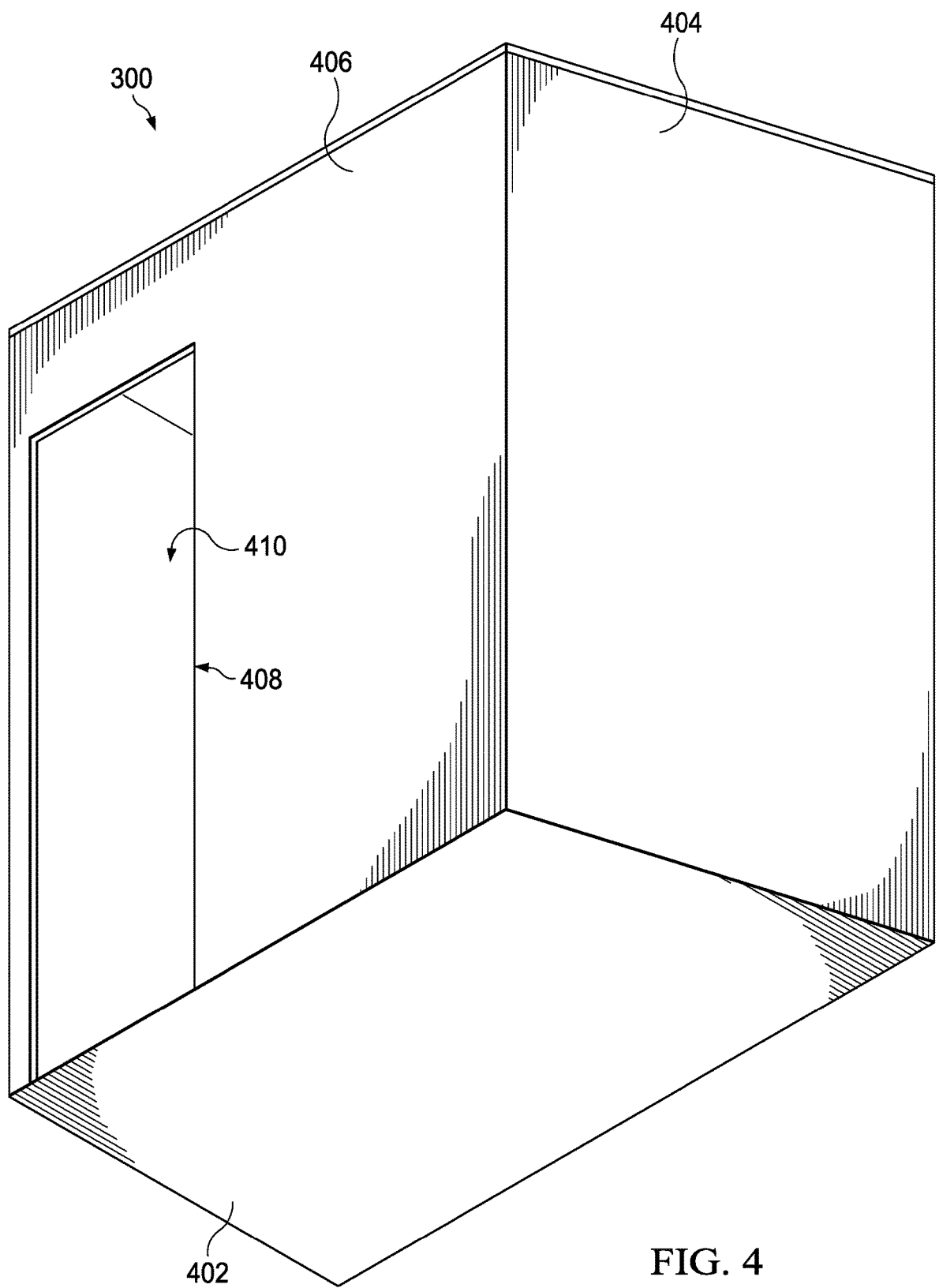
FIG. 4 is an illustration of a bottom perspective view of an aircraft monument in accordance with an illustrative embodiment.

Turning now to FIG. 4, an illustration of a bottom perspective view of an aircraft monument is depicted in accordance with an illustrative embodiment. In view 400, floor 402, fourth wall 404, and first wall 406 having first doorway 408 are visible.

When installed in an aircraft, such as aircraft 100 of FIG. 1 or aircraft 200 of FIG. 2, first doorway 408 provides opening 410 to access a cockpit door (not depicted). When installed in an aircraft, such as aircraft 100 of FIG. 1 or aircraft 200 of FIG. 2, floor 402 is joined to a floor of the aircraft.

Figure 5:
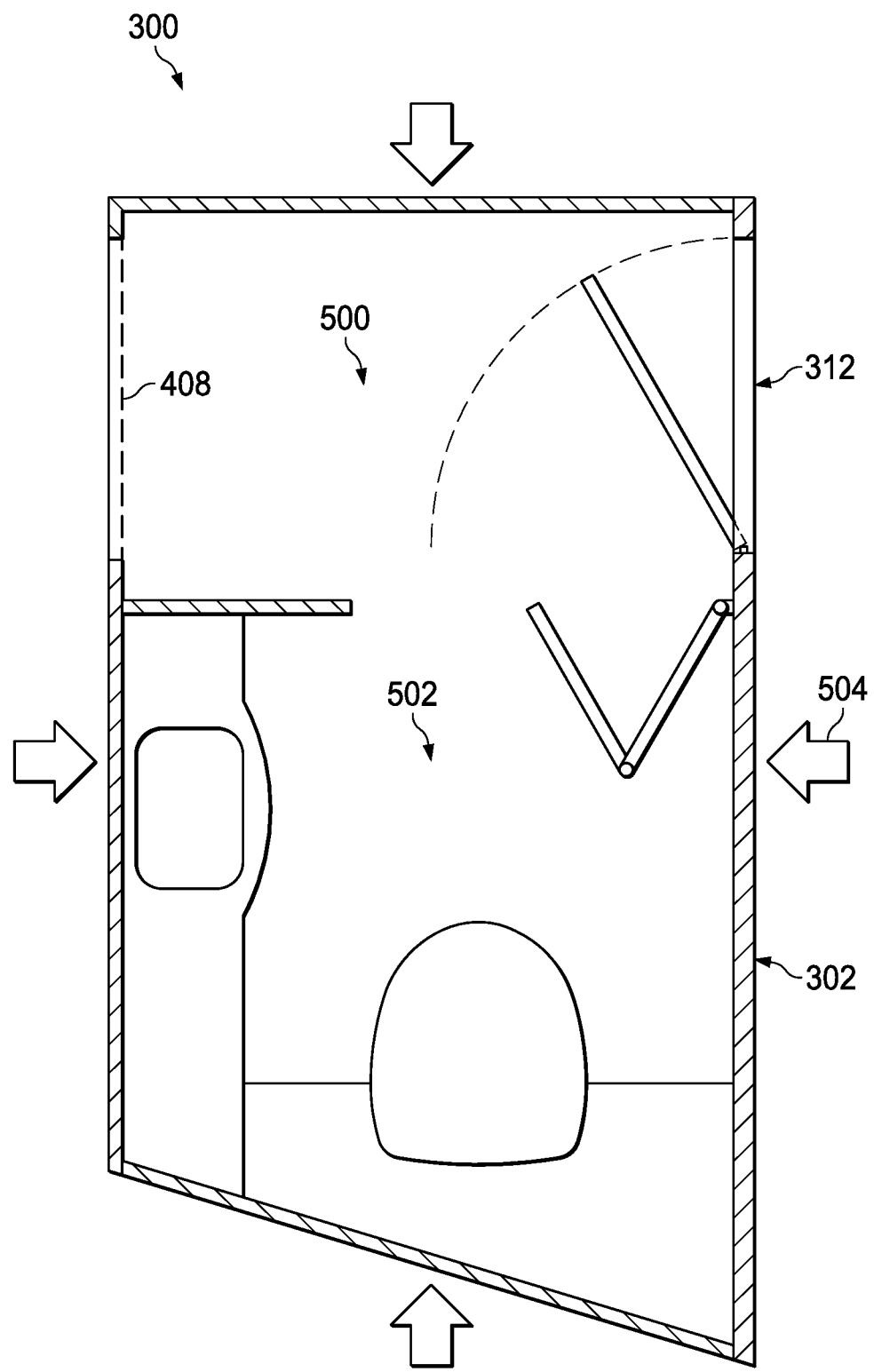
FIG. 5 is a floorplan of an aircraft monument in accordance with an illustrative embodiment.

Turning now to FIG. 5, a floorplan of an aircraft monument is depicted in accordance with an illustrative embodiment. FIG. 5 is a floorplan view of aircraft monument 300 of FIGS. 3 and 4. As depicted, aircraft monument 300 is a monument to be installed on a port side of an aircraft.

Hallway 500 is visible between first doorway 408 and second doorway 312. Hallway 500 is integral to aircraft monument 300.

Lavatory module 502 is also visible in FIG. 5. Lavatory module 502 may be substantially the same as a conventional lavatory module.

Loads 504 acting on aircraft monument 300 will not be transferred to the floor of the aircraft. Loads 504 acting on aircraft monument 300 are carried by plurality of walls 302.

Figure 6:
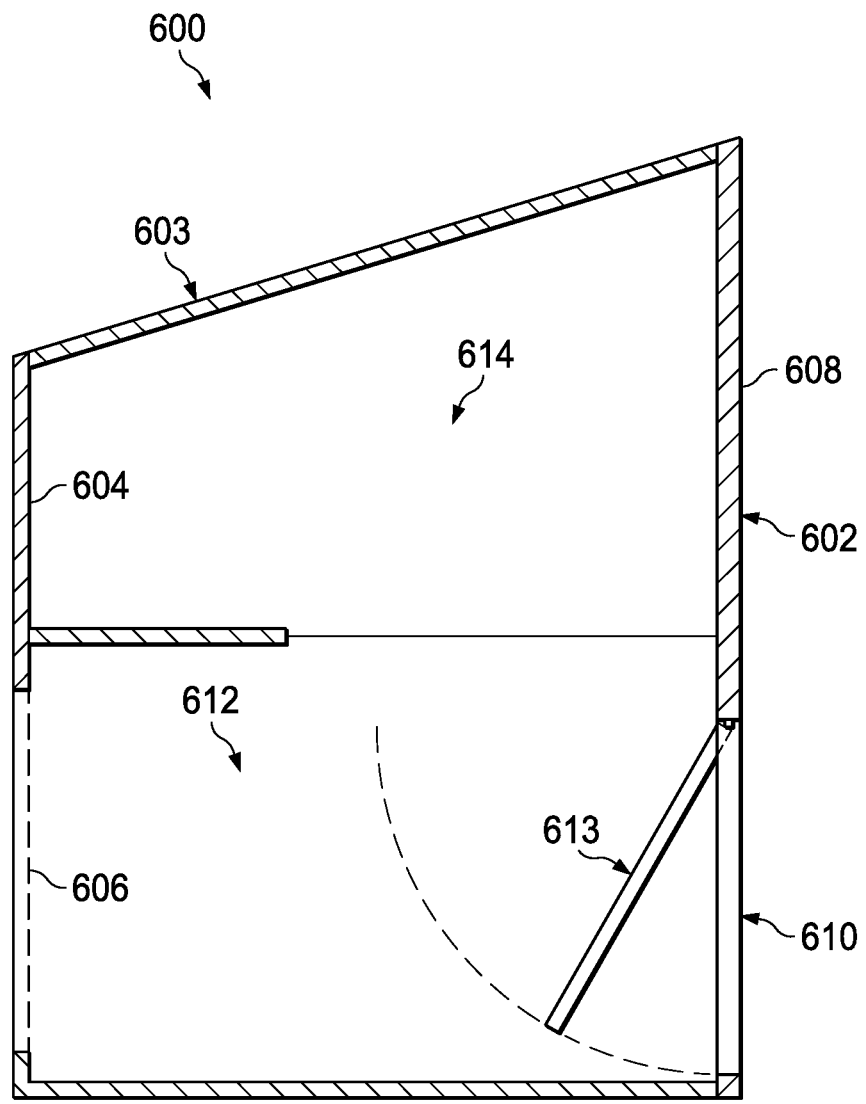
FIG. 6 is a floorplan of an aircraft monument in accordance with an illustrative embodiment.

Turning now to FIG. 6, a floorplan of an aircraft monument is depicted in accordance with an illustrative embodiment. As depicted, aircraft monument 600 is a monument to be installed on a starboard side of an aircraft. Aircraft monument 600 is a physical implementation of aircraft monument 206 of FIG. 2. Aircraft monument 600 may be installed in aircraft 100 of FIG. 1 or aircraft 200 of FIG. 2.

Aircraft monument 600 has plurality of walls 602 joined together into unitary structure 603. Plurality of walls 602 includes first wall 604 having first doorway 606 and second wall 608 having second doorway 610.

Hallway 612 is visible between first doorway 606 and second doorway 610. Hallway 612 is integral to aircraft monument 600.

Hallway 612 is configured to connect a cockpit (not depicted) to a passenger cabin (not depicted). First wall 604 provides an opening for access to a cockpit door (not depicted). Second doorway 610 contains secondary security door 613.

Closet module 614 is visible in FIG. 6. Closet module 614 may be substantially the same as a conventional closet module.

Figure 7:
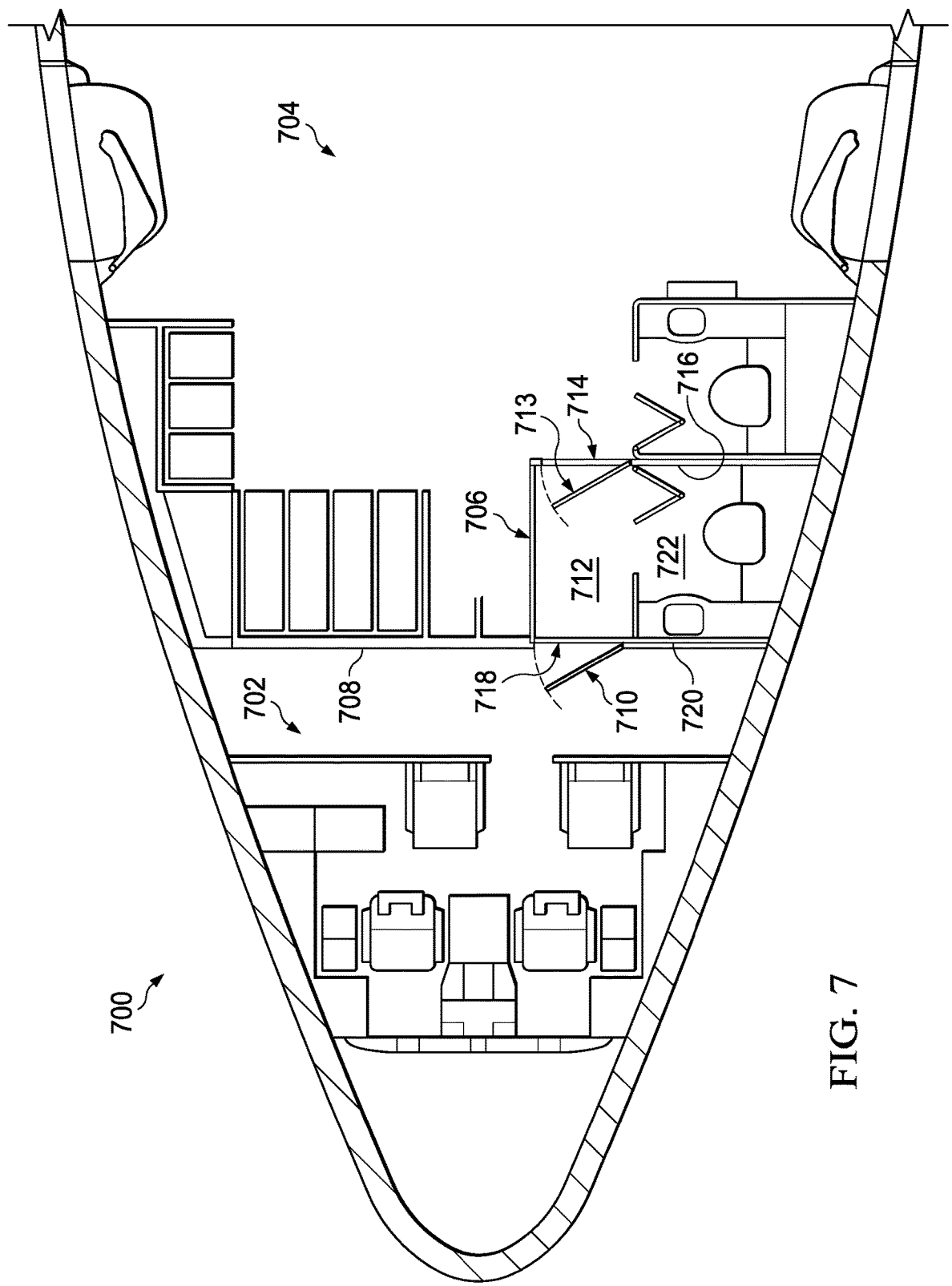
FIG. 7 is a floorplan of an aircraft in accordance with an illustrative embodiment.

Turning now to FIG. 7, a floorplan of an aircraft is depicted in accordance with an illustrative embodiment. Floorplan 700 may be a design for one of aircraft 100 of FIG. 1 or aircraft 200 of FIG. 2.

Floorplan 700 includes cockpit 702, passenger cabin 704, and aircraft monument 706. As depicted, bulkhead 708 of cockpit 702 includes cockpit door 710.

Hallway 712, integrated in aircraft monument 706, connects cockpit 702 and passenger cabin 704. Secondary security door 713 is present in second doorway 714 in second wall 716 of aircraft monument 706. First doorway 718 of first wall 720 of aircraft monument 706 provides an opening for access to cockpit door 710.

The illustration of floorplan 700 is not meant to imply physical or architectural limitations to the manner in which an illustrative embodiment may be implemented. Other components, in addition to or in place of the ones illustrated, may be used. Some components may be unnecessary.

For example, aircraft monument 706 may be present on the port side, the starboard side, substantially centered, or in any desirable location in floorplan 700. As another example, a module other than lavatory 722 may be present in aircraft monument 706. For example, a galley, a closet, equipment, a workstation, crew rest area, or any other type of module may be present instead of lavatory 722. In some illustrative examples, a functional module may include more than one function. In other illustrative examples, aircraft monument 706 may not have a functional module.

The different components shown in FIG. 1 and FIGS. 3-7 may be combined with components in FIG. 2, used with components in FIG. 2, or a combination of the two. Additionally, some of the components in FIG. 1 and FIGS. 3-7 may be illustrative examples of how components shown in block form in FIG. 2 can be implemented as physical structures.

Figure 8:
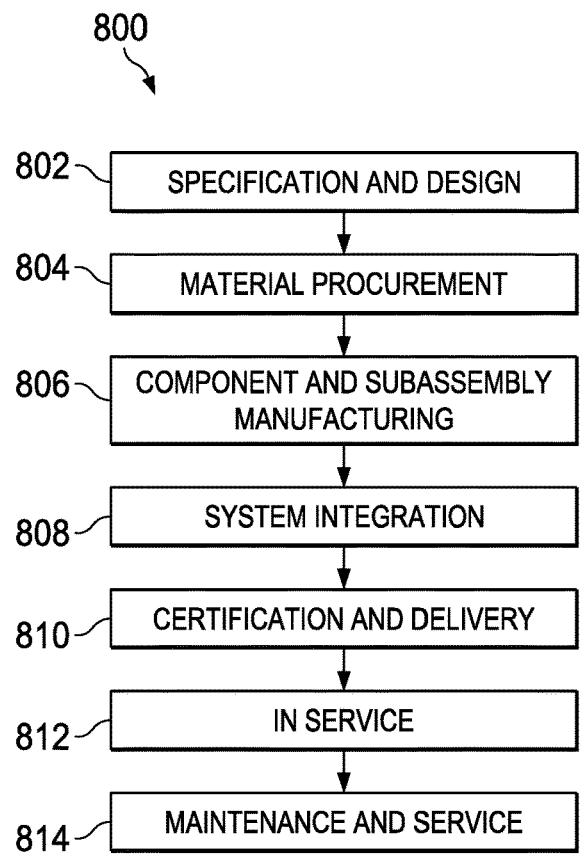
FIG. 8 is an illustration of an aircraft manufacturing and service method in accordance with an illustrative embodiment.
Figure 9:
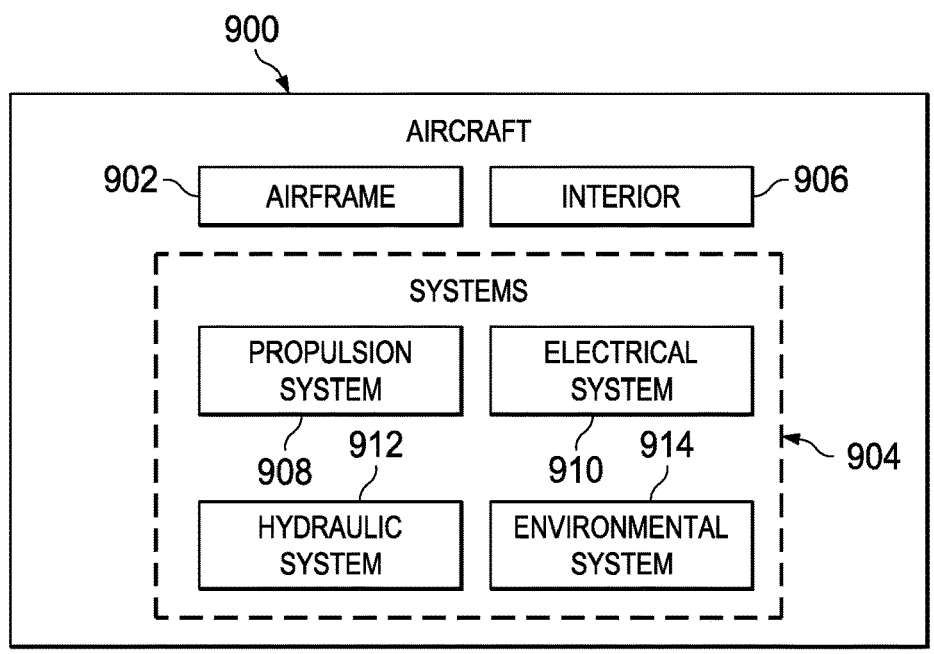
FIG. 9 is an illustration of an aircraft in which an illustrative embodiment may be implemented.

Illustrative embodiments of the present disclosure may be described in the context of aircraft manufacturing and service method 800 as shown in FIG. 8 and aircraft 900 as shown in FIG. 9. Turning first to FIG. 8, an illustration of an aircraft manufacturing and service method is depicted in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 takes place. Thereafter, aircraft 900 may go through certification and delivery 810 in order to be placed in service 812. While in service 812 by a customer, aircraft 900 is scheduled for routine maintenance and service 814, which may include modification, reconfiguration, refurbishment, or other maintenance and service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 9, an illustration of an aircraft is depicted in which an illustrative embodiment may be implemented. In this example, aircraft 900 is produced by aircraft manufacturing and service method 800 in FIG. 8 and may include airframe 902 with plurality of systems 904 and interior 906. Examples of systems 904 include one or more of propulsion system 908, electrical system 910, hydraulic system 912, and environmental system 914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 800 of FIG. 8.

One or more illustrative embodiments may be used during component and subassembly manufacturing 806. For example, aircraft monument 206 of FIG. 2 may be installed within aircraft 200 during component and subassembly manufacturing 806 of FIG. 8. Aircraft monument 206 may be manufactured prior to installation within aircraft 200 during component and subassembly manufacturing 806 of FIG. 8. Further, aircraft monument 206 may be installed as a retrofit or replacement within aircraft 200 during maintenance and service 814 of FIG. 8.

The illustrative examples present an aircraft with a secondary security door. The illustrative examples create a larger aircraft monument with an integral hallway. In one illustrative example, a new larger aircraft monument with a lavatory module and an integral hallway is designed.

Conventional additions of secondary doors include re-enforcing the surrounding structure to comply with the loads. Conventional additions of secondary doors add weight, add part cost, may limit configurability, is typically costly to design, or may not be technically feasible.

Conventional methods of adding a secondary door to the interior cabin creates a "mini vacuum chamber" in the hallway between the flight deck door and conventional secondary door. During a decompression event, this configuration produces loads on the airplane floors, ceilings, and monuments that may go beyond the airplane load provisions. Extensive rework to the airplane is typically done to support offering a secondary door.

In the illustrative examples, since the hallway pressures are contained within an enclosed single module, the decompression loads act on the module rather than the independent structures around the hall. In the illustrative examples, loads on floors and ceiling structures, and tipping loads on monuments, are all protected.

By using an enclosed module for this application in these illustrative examples, the hallway pressures are contained within that monument, rather than acting on the independent structures around the hallway. Load impacts on the airplane floors and ceiling structures, and tipping loads on monuments, are minimized or protected.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft monument comprising:
   a plurality of walls joined together into a unitary structure, the plurality of walls comprising a first wall having a first doorway and a second wall having a second doorway;
   a secondary security door within the second doorway in the second wall; and
   a hallway between the first doorway and the second doorway.

2. The aircraft monument of claim 1, wherein the plurality of walls further comprises a ceiling and a floor.

3. The aircraft monument of claim 2, wherein the floor of the aircraft monument is joined to a floor of an aircraft.

4. The aircraft monument of claim 1, wherein the first doorway provides an opening to access a cockpit door.

5. The aircraft monument of claim 1 further comprising a functional module.

6. The aircraft monument of claim 5, wherein the functional module includes at least one of a lavatory, a closet, a galley, equipment, a workstation, or a crew rest area.

7. The aircraft monument of claim 1, wherein the plurality of walls comprises a plurality of composite panels.

8. An aircraft comprising:
   a cockpit;
   a passenger cabin; and
   an aircraft monument containing a hallway connecting the cockpit and the passenger cabin, wherein the aircraft monument is formed of a plurality of walls joined together to form a unitary structure, the plurality of walls including a first wall having a first doorway and a second wall having a second doorway, wherein a secondary security door is within the second doorway.

9. The aircraft of claim 8, wherein the plurality of walls further comprises a ceiling and a floor.

10. The aircraft of claim 9, wherein the floor of the aircraft monument is joined to a floor of the aircraft.

11. The aircraft of claim 8, wherein the first doorway provides an opening to access a cockpit door.

12. The aircraft of claim 11, wherein the cockpit door maintains a pressure difference between the cockpit and the hallway.

13. The aircraft of claim 8, wherein the aircraft monument further comprises a functional module.

14. The aircraft of claim 13, wherein the functional module includes at least one of a lavatory, a closet, equipment, a galley, a workstation, or a crew rest area.

15. The aircraft of claim 8 wherein the aircraft monument further comprises at least one vent configured to relieve a pressure difference between the cockpit and the passenger cabin.

16. An aircraft comprising:
   a cockpit door, wherein a first doorway in a first wall of an aircraft monument provides an opening to access the cockpit door; and
   a secondary security door, wherein the secondary security door is within a second doorway in a second wall of the aircraft monument, wherein the aircraft monument comprises a plurality of walls joined together to form a unitary structure, wherein the plurality of walls includes the first wall and the second wall, and wherein the aircraft monument further comprises a hallway between the first doorway and the second doorway.

17. The aircraft of claim 16, wherein the plurality of walls further comprises a ceiling and a floor.

18. The aircraft of claim 17, wherein the floor of the aircraft monument is joined to a floor of the aircraft.

19. The aircraft of claim 16, wherein the aircraft monument further comprises a functional module including at least one of a lavatory, a closet, equipment, a galley, a workstation, or a crew rest area.

20. The aircraft of claim 16, wherein the aircraft monument further comprises at least one vent configured to relieve a pressure difference between a cockpit and a passenger cabin.

21. The aircraft monument of claim 1, wherein all loads acting on the monument are carried by the plurality of walls.

* * * * *